(12) United States Patent
Murthy-Bellur et al.

(10) Patent No.: US 10,110,138 B1
(45) Date of Patent: Oct. 23, 2018

(54) SOFT-STARTING CONTROL METHOD FOR ELECTRICAL CONVERTER

(71) Applicant: Cummins Power Generation IP, Inc., Minneapolis, MN (US)

(72) Inventors: Subbarao Dakshina Murthy-Bellur, Minneapolis, MN (US); Heng Yang, Marietta, GA (US); Minyu Cai, West Lafayette, IN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days.

(21) Appl. No.: 15/607,141

(22) Filed: May 26, 2017

(51) Int. Cl.
    *H02M 1/36* (2007.01)
    *H02M 3/335* (2006.01)
    *H02M 1/00* (2006.01)

(52) U.S. Cl.
    CPC ......... *H02M 3/33592* (2013.01); *H02M 1/36* (2013.01); *H02M 3/33584* (2013.01); *H02M 2001/0058* (2013.01)

(58) Field of Classification Search
    CPC .... H02M 1/36; H02M 3/335; H02M 3/33523; H02M 3/33507; H02M 3/33538; H02M 3/33546; H02M 3/33553; H02M 3/33569; H02M 3/33584; H02M 3/33592
    See application file for complete search history.

(56) References Cited

U.S. PATENT DOCUMENTS

| | | | |
|---|---|---|---|
| 5,355,294 A | 10/1994 | De Doncker et al. | |
| 5,481,449 A * | 1/1996 | Kheraluwala | H02M 1/4208 323/259 |
| 8,587,975 B2 | 11/2013 | Jain et al. | |

(Continued)

FOREIGN PATENT DOCUMENTS

| | | |
|---|---|---|
| CN | 103516224 | 1/2014 |
| CN | 103916019 | 7/2014 |

(Continued)

OTHER PUBLICATIONS

B. Zhao et al., "Overview of Dual-Active-Bridge Isolated Bidirectional DC -DC Converter for High-Frequency-Link Power-Conversion System," in IEEE Transactions on Power Electronics, vol. 29, No. 8, pp. 4091-4106, Aug. 2014.

Bai, Hua et al., "Eliminate reactive power and increase system efficiency of isolated bidirectional dual-active-bridge DC/DC converters using novel dual-phase-shift control." IEEE Transactions on Power Electronics 23, No. 6 (2008): 2905-2914.

Demetriades, Georgios D. et al., "Dynamic modeling of the dual-active bridge topology for high-power applications." In Power Electronics Specialists Conference, pp. 457-464. 2008.

(Continued)

*Primary Examiner* — Timothy J Dole
*Assistant Examiner* — Sisay G Tiku
(74) *Attorney, Agent, or Firm* — Foley & Lardner LLP (57) ABSTRACT

One direct current to direct current converter disclosed herein can implement three control modes: a predefined control mode in which an outer phase-shift angle is determined based on a predefined process, a current control mode in which the outer phase-shift angle is determined based on a predefined reference current profile and a DC current output, and a voltage-current control mode in which a reference current value is determined using a reference voltage value and a DC voltage output. The soft starting process can start from the predefined control mode and later switch to the current control mode followed by the voltage-current control mode or directly switch to the voltage-current control mode. The soft starting process can also start from the current control mode and later switch to the voltage-current control mode.

15 Claims, 9 Drawing Sheets

(56) References Cited

U.S. PATENT DOCUMENTS

| | | | |
|---|---|---|---|
| 9,190,915 B2 * | 11/2015 | Inoue | H02M 3/33507 |
| 9,300,219 B2 * | 3/2016 | Hirano | H02M 3/33561 |
| 9,438,126 B2 * | 9/2016 | Hirano | H02M 3/3353 |
| 9,621,056 B2 * | 4/2017 | Wu | H02M 3/33507 |
| 9,742,296 B2 * | 8/2017 | Inoue | H02M 3/33546 |
| 9,837,919 B2 * | 12/2017 | Yoo | H02M 3/33584 |
| 9,853,557 B2 * | 12/2017 | Hirano | H02M 3/33584 |
| 2009/0196072 A1 | 8/2009 | Ye | |
| 2011/0249472 A1 * | 10/2011 | Jain | H02M 3/33584 363/15 |
| 2014/0185328 A1 * | 7/2014 | Rosado | H02M 1/40 363/17 |
| 2015/0171729 A1 * | 6/2015 | Scandola | H02M 3/158 363/21.02 |
| 2015/0303815 A1 * | 10/2015 | Chen | H02M 3/158 363/21.04 |
| 2015/0349647 A1 * | 12/2015 | Zane | H02M 3/33507 363/17 |
| 2015/0349649 A1 * | 12/2015 | Zane | H02M 3/33507 363/21.03 |
| 2016/0139651 A1 | 5/2016 | Schramm et al. | |
| 2017/0310229 A1 | 10/2017 | Fujisaki et al. | |
| 2018/0026540 A1 * | 1/2018 | Chen | H02M 3/158 |

FOREIGN PATENT DOCUMENTS

| | | |
|---|---|---|
| EP | 3 079 250 A1 | 10/2016 |
| JP | 2012-065511 | 3/2012 |

OTHER PUBLICATIONS

Giuliani, Francesco et al., "Soft-starting procedure for dual active bridge converter." In Control and Modeling for Power Electronics (COMPEL), 2015 IEEE 16th Workshop on, pp. 1-6. IEEE, 2015.

Harrye, Yasen A. et al., "Reactive Power Minimization of Dual Active Bridge DC/DC Converter with Triple Phase Shift Control using Neural Network." 3rd International Conference on Renewable Energy Research and Applications, pp. 566-571. Oct. 22, 2014.

Jain, Amit Kumar et al., "PWM control of dual active bridge: Comprehensive analysis and experimental verification." IEEE Transactions on Power Electronics 26, No. 4 (2011): 1215-1227.

Krismer, Florian et al., "Accurate small-signal model for the digital control of an automotive bidirectional dual active bridge." IEEE transactions on power electronics 24, No. 12 (2009): 2756-2768.

M. Kim et al., "A dual-phase-shift control strategy for dual-active-bridge DC-DC converter in wide voltage range," Power Electronics and ECCE Asia (ICPE & ECCE), 2011 IEEE 8th International Conference on, Jeju, 2011, pp. 364-371.

X. Liu et al., "Novel Dual Phase Shift Control with Bi-directional Inner phase shifts for Dual Active Bridge Converter Having Low Surge Current and Stable Power Control." IEEE Transactions on Power Electronics 32, No. 5 (Jul. 22, 2016): 4095-4106.

Zhao, Biao et al., "Universal high-frequency-link characterization and practical fundamental-optimal strategy for dual-active-bridge DC-DC converter under PWM plus phase-shift control." IEEE Transactions on Power Electronics 30, No. 12 (2015): 6488-6494.

Zhou, Haihua et al., "Interleaved bi-directional dual active bridge DC-DC converter for interfacing ultracapacitor in micro-grid application." In 2010 IEEE International Symposium on Industrial Electronics, pp. 2229-2234. IEEE, 2010.

Zhu, Zhonghu et al., "Analysis of the startup method for building up DC voltage via body diode rectifying in Dual Active Bridge converter." In Electronics and Application Conference and Exposition (PEAC), 2014 International, pp. 1407-1410. IEEE, 2014.

Biao Zhao et al: "Power Characterization of Isolated Bidirectional Dual-Active-Bridge DC DC Converter With Dual-Phase-Shift Control", IEEE Transactions on Power Electronics, Institute of Electrical and Electronics Engineers, USA, vol. 27, No. 9, Sep. 1, 2012 (Sep. 1, 2012), pp. 4172-4176.

Feng Bo et al: "A novel dual-phase-shift control strategy for dual-active-bridge DC-DC converter", IECON 2014—40th Annual Conference of the IEEE Industrial Electronics Society, IEEE, Oct. 29, 2014 (Oct. 29, 2014), pp. 4140-4145.

International Search Report and Written Opinion for International Application No. PCT/US2018/032040, dated Jul. 31, 2018, 18 pages.

Krismer F et al: "Closed Form Solution for Minimum Conduction Loss Modulation of DAB Converters", IEEE Transactions on Power Electronics, Institute of Electrical and Electronics Engineers, USA, vol. 27, No. 1, Jan. 1, 2012 (Jan. 1, 2012), pp. 174-188.

Panov Yuri et al: "Transformer-flux-balancing control in isolated bidirectional DC-DC converters", 2014 IEEE Applied Power Electronics Conference and Exposition—APEC 2014, IEEE, Mar. 16, 2014 (Mar. 16, 2014), pp. 49-56.

Wen H et al: "Bidirectional dual-active-bridge DC-DC converter with triple-phase-shift control", Applied Power Electronics Conference and Exposition (APEC), 2013 Twenty-Eighth Annual IEEE, IEEE, Mar. 17, 2013 (Mar. 17, 2013), pp. 1972-1978.

* cited by examiner

FIG. 9C though whose US 10,110,138 B1

SOFT-STARTING CONTROL METHOD FOR ELECTRICAL CONVERTER

FIELD

This present disclosure relates to electrical converters.

BACKGROUND

Dual-active-bridge (DAB) direct current to direct current (DC-DC) converters are widely used in high power applications, such as variable-speed generators, electrical vehicles, switch-mode electronics, battery stores, alternative energy harnessing, renewables integration, and so on. The DAB DC-DC converter includes an H-bridge on each of the input and output sides of a transformer. Power transmission between the input and output sides depends on the leakage inductance of the transformer. When the DAB DC-DC converter is being started, the voltage at the output side is approximately zero at the beginning. The voltage at the input side is thus applied substantially fully on the leakage inductance of the transformer, which may result in large asymmetrical inrush current in the transformer. The inrush current may be several times of the steady-state current and may damage electric components and/or cause transformer saturation.

SUMMARY

One embodiment relates to a controller for soft starting a dual-active-bridge direct current to direct current (DC-DC) converter. The converter comprises a transformer, a first H-bridge connected to a primary winding of the transformer, and a second H-bridge connected to a secondary winding of the transformer. The controller is configured to perform a current control mode in which an outer phase-shift angle is determined based on a predefined reference current profile and a DC current output from the second H-bridge, while the input duty cycle has an increasing-rate limiter. The outer phase-shift angle is a phase shift between a first voltage on the primary winding and a second voltage on the secondary winding. The input duty cycle is the high-voltage time percentage of the voltage on the primary winding of the transformer. The increasing-rate limiter ensures that the input duty cycle doesn't suddenly step to a large value. The controller is further configured to determine that a first predefined event has occurred, and in response to determining that the first predefined event has occurred, switch to a voltage-current control mode in which a reference current value is determined using a reference voltage value and a DC voltage output from the second H-bridge, and the outer phase-shift angle is determined using the reference current value and the DC current output from the second H-bridge.

Another embodiment relates to a controller for soft starting a dual-active-bridge direct current to direct current (DC-DC) converter. The converter comprises a transformer, a first H-bridge connected to a primary winding of the transformer, and a second H-bridge connected to a secondary winding of the transformer. The controller is configured to perform an predefined control mode in which the outer phase-shift angle is determined based on a predefined process, determine that a predefined event has occurred, and in response to determining that the predefined event has occurred, switch to a voltage-current control mode in which a reference current value is determined using a reference voltage value and a DC voltage output from the second H-bridge, and an outer phase-shift angle is determined using the reference current value and a DC current output from the second H-bridge. The outer phase-shift angle is a phase shift between a first voltage on the primary winding and a second voltage on the secondary winding.

Yet another embodiment relates to a method for soft-starting a dual-active-bridge direct current to direct current (DC-DC) converter. The converter comprises a transformer, a first H-bridge connected to a primary winding of the transformer, and a second H-bridge connected to a secondary winding of the transformer. The method comprises performing a current control mode in which an outer phase-shift angle is determined based on a predefined reference current profile and a DC current output from the second H-bridge, while the input duty cycle has an increasing-rate limiter. The outer phase-shift angle is a phase shift between a first voltage on the primary winding and a second voltage on the secondary winding. The input duty cycle is the high-voltage time percentage of the voltage on the primary winding of the transformer. The increasing-rate limiter ensures that the input duty cycle doesn't suddenly step to a large value. The method further comprises determining that a first predefined event has occurred, and in response to determining that the first predefined event has occurred, switching to a voltage-current control mode in which a reference current value is determined using a reference voltage value and a DC voltage output from the second H-bridge, and the outer phase-shift angle is determined using the reference current value and the DC current output from the second H-bridge.

Still another embodiment relates to a method for soft-starting a dual-active-bridge direct current to direct current (DC-DC) converter. The converter comprises a transformer, a first H-bridge connected to a primary winding of the transformer, and a second H-bridge connected to a secondary winding of the transformer. The method comprises performing a predefined control mode in which the outer phase-shift angle is determined based on a predefined process, determining that a predefined event has occurred, and in response to determining that the first predefined event has occurred, switching to a voltage-current control mode in which a reference current value is determined using a reference voltage value and a DC voltage output from the second H-bridge, and the outer phase-shift angle is determined using the reference current value and the DC current output from the second H-bridge. The outer phase-shift angle is a phase shift between a first voltage on the primary winding and a second voltage on the secondary winding.

These and other features, together with the organization and manner of operation thereof, will become apparent from the following detailed description when taken in conjunction with the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Dual-active-bridge (DAB) direct current to direct current (DC-DC) converters can be used in DC-DC power conversion applications, for example, as an interface between a low-voltage battery and a high-voltage battery or a high-voltage DC bus. The DAB DC-DC converter includes an H-bridge on each of the input and output sides of a transformer. Power transmission between the input and output sides depends on the leakage inductance of the transformer. When the DAB DC-DC converter is being started, the voltage at the output side is approximately zero at the beginning. The voltage at the input side is thus applied substantially fully on the leakage inductance of the transformer, which may result in large asymmetrical inrush current in the transformer. The inrush current may be several times of the steady-state current and may damage electric components and/or cause transformer saturation.

Referring to the figures generally, various embodiments disclosed herein relate to systems and methods for soft starting a DAB DC-DC converter. As used herein, "soft-starting" refers to reducing the inrush current during startup of the converter. Three control modes are provided: a predefined control mode in which an outer phase-shift angle is controlled according to a predefined process; a current control mode in which the outer phase-shift angle is controlled with a DC output current being provided as feedback; and a voltage-current control mode in which the outer phase-shift angle is controlled with a DC output voltage and the DC output current being used as feedback. In some embodiments, the soft-starting process can start from either the predefined control mode or the current control mode. In some embodiments in which the control starts from the predefined control, various goals may be achieved in the predefined control, such as synchronous rectification, increased start-up speed, and controlled transformer peak current. The process may switch to the current control mode when, for example, the DC output current has reached a maximum charging current and further switch to the voltage-current control mode when, for example, the DC output voltage has reached a predetermined voltage threshold. Or, the control can switch directly from the predefined control to the voltage-current control mode. In some embodiments in which the soft-starting process starts from the current control mode, the process may switch to the voltage-current control mode when, for example, the DC output voltage has reached a predetermined voltage threshold.

By using the three-mode soft-starting method as disclosed herein, a variety of start-up options are provided, performance of the DAB DC-DC converter may be improved/optimized, large inrush current may be avoided, and safety and reliability of a high-voltage DC system using the DAB DC-DC converter may be improved. While the present disclosure discusses control methodologies with particular reference to DAB DC-DC converters, it should be understood that the methodologies or portions thereof may be utilized in conjunction with other types of electrical converters in some implementations.

Figure 1A:
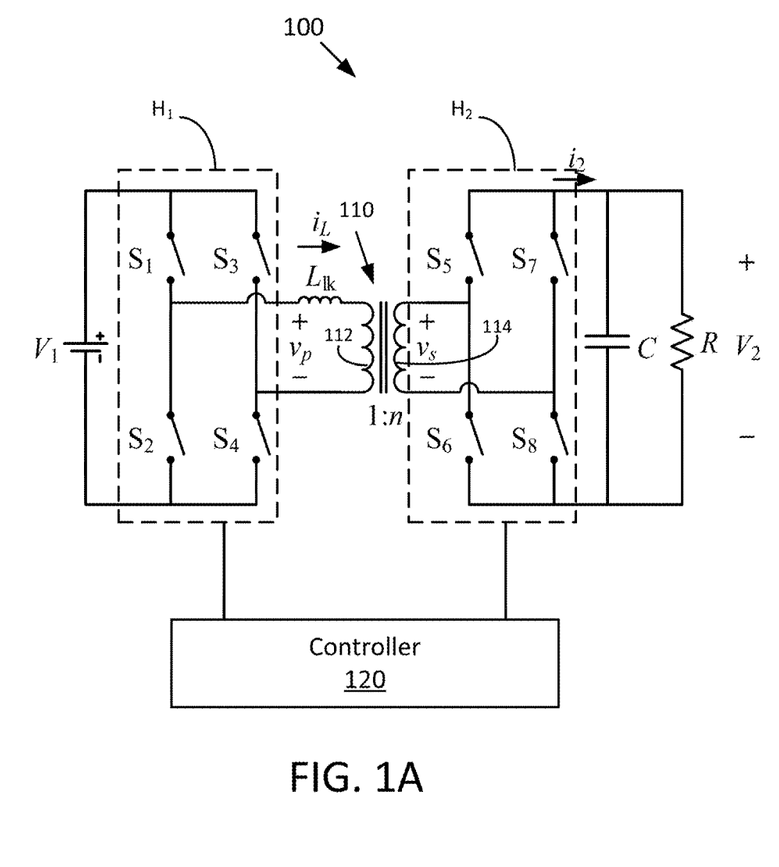
FIG. 1A is a schematic diagram of a dual-active-bridge (DAB) DC-DC converter according to an example embodiment.

Referring to FIG. 1A, a schematic diagram of a DAB DC-DC converter 100 is shown according to an example embodiment. The DAB DC-DC converter 100 comprises a transformer 110, a first H-bridge $H_1$, a second H-bridge $H_2$, and a controller 120. The transformer 110 comprises a primary winding 112 and a secondary winding 114. The first H-bridge $H_1$ is connected to the primary winding 112 and includes switch devices $S_1$ and $S_2$ on one leg of the bridge and switch devices $S_3$ and $S_4$ on the other leg of the bridge. The second H-bridge $H_2$ is connected to the secondary winding 114 and includes switch devices $S_5$ and $S_6$ on one leg of the bridge and switch devices $S_7$ and $S_8$ on the other leg of the bridge. Each of the switch devices $S_1$ through $S_8$ can be either at an "on" state or an "off" state. At the on state, circuits on two sides of the switch device are connected. At the off state, circuits on two sides of the switch device are disconnected. The controller 120 controls the on/off state for each of the switch devices $S_1$ through $S_8$.

The primary winding 112 and the secondary winding 114 of the transformer 110 are electromagnetically coupled. In some embodiments, the primary and secondary windings 112 and 114 are wrapped around a transformer core of high magnetic permeability (e.g., a magnetic or ferrous core) so that the magnetic flux passes through both the primary and secondary windings 112 and 114. A varying current (e.g., an alternating current) applied to the primary winding 112 by the first bridge $H_1$ creates a varying magnetic flux in the transformer core and a varying magnetic field impinging on the secondary winding 114. The varying magnetic field at the secondary winding 114 induces a varying voltage in the secondary winding due to electromagnetic induction. In practice, some magnetic flux generated by the primary winding 112 traverse paths outside the transformer core. Such flux is referred to as leakage flux, which results in leakage inductance $L_{lk}$ in series with the primary and secondary windings 112 and 114. In some embodiments, the transformer 110 further includes an external inductor in series with the primary and secondary windings 112 and 114. The inductance of the external inductor adds to the leakage inductance $L_{lk}$ in the circuit model.

The first H-bridge $H_1$ is structured to convert a DC voltage $V_1$ provided by a DC source (e.g., a battery) to an AC voltage applied on the primary winding 112 of the transformer 110. The DC-AC conversion is performed by controlling the on/off state of the switch devices $S_1$ through $S_4$. In particular, the voltage applied on the primary winding 112 when $S_1$ and $S_4$ are on while $S_2$ and $S_3$ are off is opposite to the voltage applied when $S_2$ and $S_3$ are on while $S_1$ and $S_4$ are off. The switch devices $S_1$ through $S_4$ may be insulated gate bipolar transistors (IGBTs), metal oxide semiconductor field effect transistors (MOSFETs), junction field effect transistors (JFETs), or any other suitable switch devices.

The second H-bridge $H_2$ is structured to convert an AC voltage on the secondary winding 114 to a DC voltage $V_2$ applied on a load R. The AC-DC conversion is performed by controlling the on/off state of the switch devices $S_5$ through $S_8$. When $S_5$ and $S_8$ are on, $i_2$ has the same polarity as $i_L$. When $S_6$ and $S_7$ are on, $i_2$ has the polarity opposite to $i_L$. When $S_5$ and $S_7$ are on (off) while $S_6$ and $S_8$ are off (on), $i_2$ is zero. By controlling $S_5$ through $S_8$, the AC current $i_L$ is converted to $i_2$ which has a positive average value. Current $i_2$ is filtered by an output capacitor C and becomes a DC current going into the load R. The switch devices $S_5$ through $S_8$ may be IGBTs, MOSFETs, JFETs, and so on. The controller 120 controls the on/off state for each of the switch device $S_1$ through $S_8$. The structure of the controller 120 is discussed below in detail with reference to FIG. 4. When the voltage conversion ratio (i.e., $v_1:V_2$) does not match the transformer turns ratio (i.e., 1:n), the rms value of the current flowing through the transformer 110 may be higher.

Figure 1B:
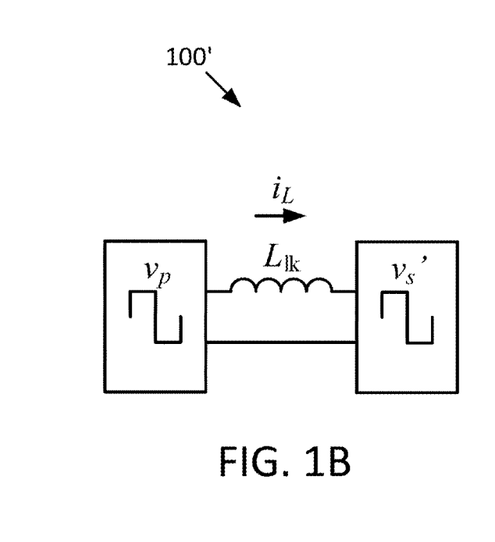
FIG. 1B is a schematic diagram of a simplified equivalent circuit for the DAB DC-DC converter of FIG. 1A.

Referring to FIG. 1B, a schematic diagram of a simplified equivalent circuit 100' for the DAB DC-DC converter 100 of FIG. 1A is shown. In operation, the DAB DC-DC converter 100 can be equivalent to two high frequency AC sources $v_p$ and $v_s'$ connected on both sides of the leakage inductance $L_{lk}$, as shown in the FIG. 1B. $v_p$ is the AC voltage on the primary winding 112 of the transformer 110 and $v_s'$ (converted from $v_s$ to take into account the transformer turns ratio) is the AC voltage on the secondary winding 114 of the transformer 110.

Figure 2:
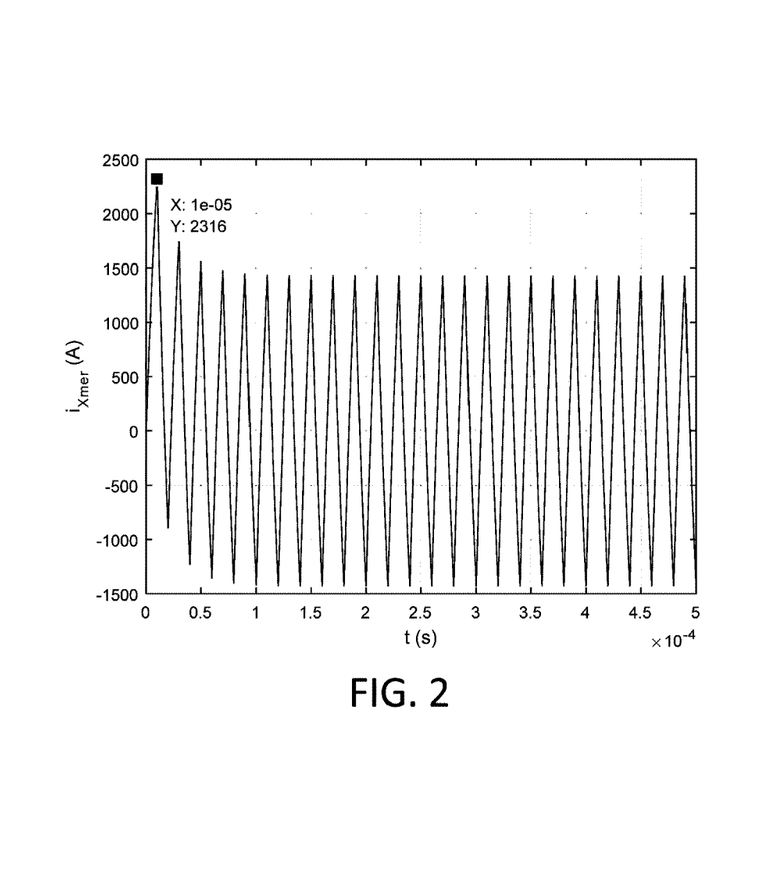
FIG. 2 is a graph showing a level of current flowing through a transformer of a DAB DC-DC converter during startup of the converter according to an example embodiment.

Referring to FIG. 2, a level of current flowing through the transformer 110 of the DAB DC-DC converter 100 during startup of the converter 110 is shown in a graph according to an example embodiment. When the converter 100 is being started, the voltage $v_s'$ on the secondary winding 114 is approximately zero (0) at the beginning. Thus, the voltage $v_p$ on the primary winding 112 is applied substantially fully on the leakage inductance $L_{lk}$ of the transformer 110, which may result in large asymmetrical inrush current in the transformer 110, as shown in FIG. 2. The inrush current may be several times of the steady-state current $i_l$ and may damage electric components (e.g. switch devices $S_1$ through $S_8$) and/or cause saturation of the transformer 110. Soft starting is generally applied to reduce the inrush current.

Figure 3:
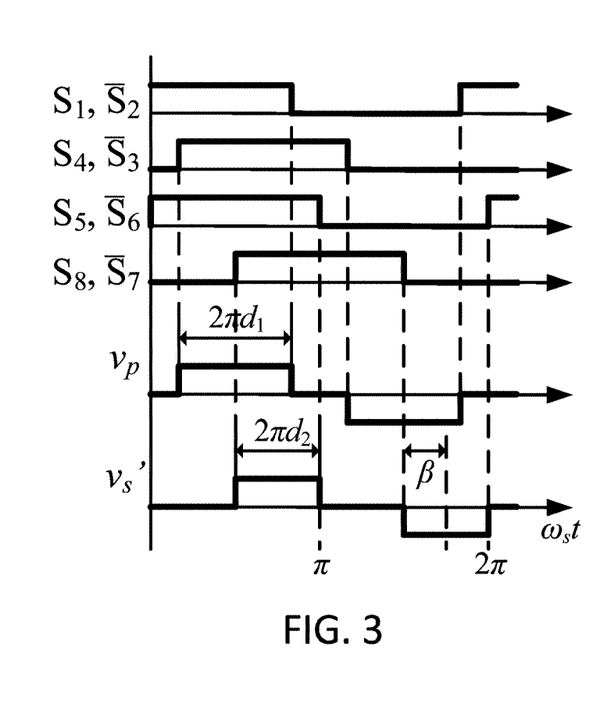
FIG. 3 is a graph of waveforms of the control signals and waveforms of the transformer input and output voltages for a DAB DC-DC converter according to an example embodiment.

Referring to FIG. 3, a graph of waveforms of control signals for switch devices $S_1$ through $S_8$ and waveforms of the input voltage $v_p$ and the output voltage $v_s'$ are shown according to an example embodiment. In the illustrated embodiment, switch devices disposed on the same leg of a bridge (e.g., $H_1$, $H_2$) are driven with complimentary (i.e., opposite) square wave pulses. For example, the waveforms of the control signals for switch devices $S_1$ and $S_2$ are complimentary. $S_3$ and $S_4$ form a complimentary pair; $S_5$ and $S_6$ form a complimentary pair; and $S_7$ and $S_8$ form a complimentary pair. As a result, the AC voltage $v_p$ on the primary winding and the AC voltage $v_s'$ on the secondary winding are also square waves. In particular, the polarity of the voltage $v_p$ is positive (+) when $S_1$ and $S_4$ are both on (i.e., the control signal is 1), is negative (−) when $S_2$ and $S_3$ are both on, and is zero (0) otherwise. The polarity of the voltage $v_s'$ is positive (+) when $S_5$ and $S_8$ are both on, is negative (−) when $S_6$ and $S_7$ are both on, and is zero (0) otherwise.

The phase difference between the voltages $v_p$ and $v_s'$ is defined as an outer phase-shift angle β. The outer phase-shift angle β controls the direction and magnitude of power transmission of the DAB DC-DC converter 100. When β is positive, the voltage $v_p$ on the primary winding 112 leads the voltage $v_s'$ on the secondary winding 114, and the power is transmitted from the primary winding side to the secondary winding side. When β is negative, the voltage $v_p$ on the primary winding 112 lags behind the voltage $v_s'$ on the secondary winding 114, and the power is transmitted from the secondary winding side to the primary winding side. β may vary between 0 and π/2.

The duration in which $v_p$ is positive is defined as $2\pi d_1$, wherein a full cycle of operation is normalized to 2π. The percentage of positive $v_p$ in a cycle is defined as the first duty cycle $d_1$. The duration in which $v_s'$ is positive is defined as $2\pi d_2$, wherein a full cycle of operation is normalized to 2π. The percentage of positive $v_s'$ in a cycle is defined as the second duty cycle $d_2$. The first and second duty cycles $d_1$ and $d_2$ may each vary between 0 and 0.5. The operation of the DAB DC-DC converter 100 can be changed by controlling the first and second duty cycles $d_1$ and $d_2$ and the outer phase-shift angle β.

Figure 4:
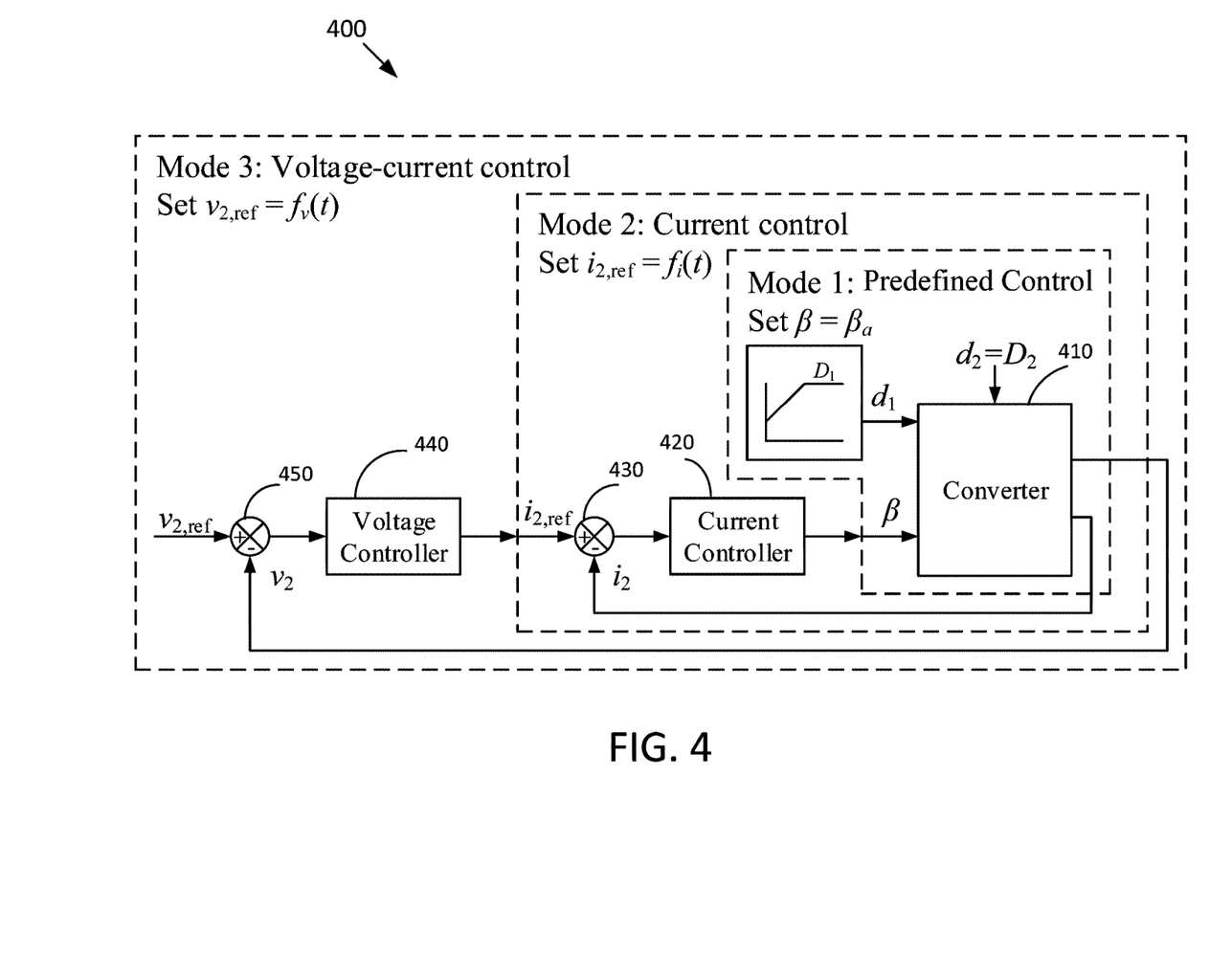
FIG. 4 is a schematic diagram of a control system for soft starting a DAB DC-DC converter according to an example embodiment.

Referring to FIG. 4, a schematic diagram of a control system 400 for soft starting a DAB DC-DC converter (e.g., the DAB DC-DC converter 100 of FIG. 1) is shown according to an example embodiment. The control system 400 comprises a converter 410, a current controller 420, a current comparator 430, a voltage controller 440, and a voltage comparator 450. The converter 410 may correspond to the DAB DC-DC converter 100 of FIG. 1, which is configured to generate control signals to control the on/off state for each of the switch device $S_1$ through $S_8$ based on the outer phase-shift angle β and the first and second duty cycles $d_1$ and $d_2$. The current comparator 430 is configured to compare a reference current $i_{2,ref}$ with a DC current $i_2$ flowing through the load R at the output side of the transformer 110. The output of the current comparator 430 (e.g., the difference between $i_2$ and $i_{2,ref}$) is fed to the current controller 420. The current controller 420 may be implemented as a proportional integral (PI) controller with saturation and anti-windup, which is configured to generate the outer phase-shift angle β based on the output of the current comparator 430 in order to reduce (e.g., minimize) the difference between $i_2$ and $i_{2,ref}$. The voltage comparator 450 is configured to compare a reference voltage $v_{2,ref}$ with a DC voltage $v_2$ on the load R at the output side of the transformer 110. The output of the voltage comparator 450 (e.g., the difference between $v_2$ and $v_{2,ref}$) is fed to the voltage controller 440. The voltage controller 440 may be implemented as a PI controller with saturation and anti-windup, which is configured to generate the reference current $i_{2,ref}$ in order to reduce (e.g., minimize) the difference between $v_2$ and $v_{2,ref}$.

The control system 400 may implement three control modes: a predefined control mode, a current control mode, and a voltage-current control mode. In the predefined control mode, the converter 410 is involved while the current controller 420 (and the current comparator 430) and the voltage controller 440 (and the voltage comparator 450) are not involved. In some embodiments, the second duty cycle $d_2$ may be set as a nominal value $D_2$ (e.g., 0.5). The first duty cycle $d_1$ may be set to increase from an initial value (e.g., 0) to a nominal value $D_1$ (e.g., 0.5) over time. The outer phase-shift angle β may be generated according to a predetermined process to achieve various goals, such as synchronous rectification, increased start-up speed, transformer peak current limit, etc. The process used to generate β in the predefined control mode will be discussed in more detail below. In the current control mode, the converter 410 and the current controller 420 (and the current comparator 430) are involved while the voltage controller 440 (and the voltage comparator 450) are not involved. The outer phase-shift angle β in this mode may be generated based on the reference current $i_{2,ref}$ and the DC current $i_2$ flowing through the load R at the output side of the transformer 110. In the current control mode, $i_{2,ref}$ may follow a predefined reference current profile. In some embodiments, the input duty cycle has an increasing-rate limiter. The increasing-rate limiter ensures that the input duty cycle does not suddenly step to a large value. In the voltage-current control mode, the converter 410, the current controller 420 (and the current comparator 430), and the voltage controller 440 (and the voltage comparator 450) are all involved. In this mode, the reference current $i_{2,ref}$ is generated based on the reference voltage $v_{2,ref}$ and the DC voltage $v_2$ on the load R at the output side of the transformer 110. Then the outer phase-shift angle β is generated based on $i_{2,ref}$ and $i_2$. It should be understood that components of the control system 400 may be implemented as software, hardwired circuit, or any combination thereof. It should also be understood that components of the controlling system 400 can be integrated.

Figure 5:
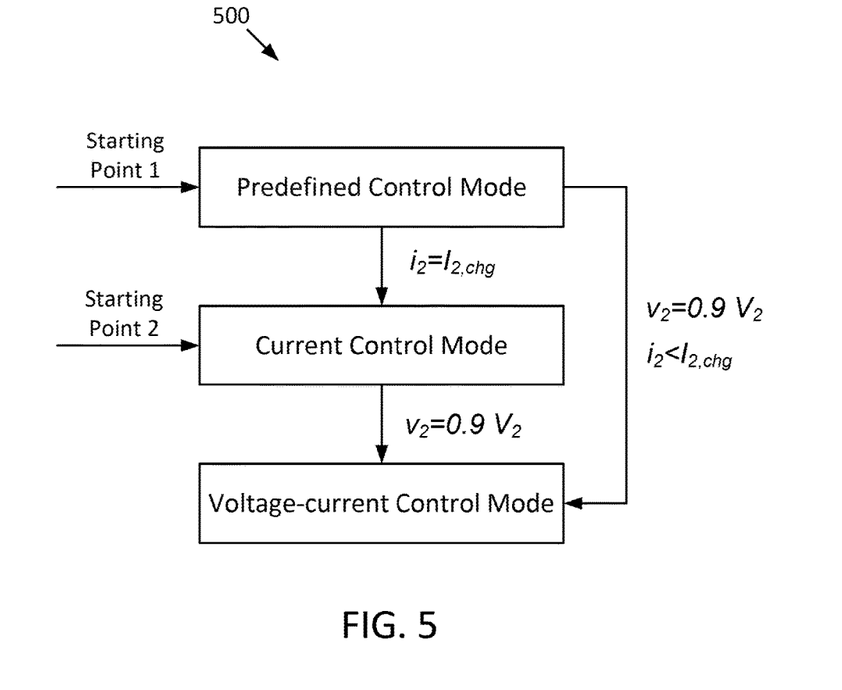
FIG. 5 is a flow diagram of a process for soft starting a DAB DC-DC converter according to an example embodiment.

Referring to FIG. 5, a flow diagram of a process 500 for soft starting a DAB DC-DC converter (e.g., the DAB DC-DC converter 100 of FIG. 1) is shown according to an example embodiment. In some embodiments, the process 500 starts with the predefined control mode (i.e., starting point 1). The process may then either switch to the current control mode followed by the voltage-current control mode or directly switch to the voltage-current control mode, depending on predefined events. For example, when a first predefined event has occurred, e.g., when the DC current $i_2$ flowing through load R at the output side of the transformer 110 has reached a predetermined current level $I_{2,chg}$, the process switches to the current control mode. The predetermined current level $I_{2,chg}$ may be the maximum charging current. The initial reference current $i_{2,ref}$ in the current control mode may be set as $I_{2,chg}$. The initial output of the current controller 420 may be set as the outer phase-shift angle β at the end of the predefined control mode. The process may then switch from the current control mode to the voltage-current control mode when a second predefined event has occurred, e.g., when the DC voltage $v_2$ on load R at the output side of the transformer 110 has reached a predetermined voltage level (e.g., 90% of a nominal voltage $V_2$), or a predetermined period of time has elapsed since the start of the current control mode. While operating in the voltage-current control mode, the output voltage may increase from 90% to 100% of $V_2$. The initial reference voltage $v_{2,ref}$ in the voltage-current control mode may be set as 0.9 $V_2$. The initial output of the voltage controller 440 may be set as the reference current $i_{2,ref}$ at the end of the current control mode.

In some embodiments, the control may directly switch from the predefined control mode to the voltage-current control mode when a predefined event has occurred, e.g., when the DC voltage $v_2$ on the output side of the transformer 110 has reached a predetermined voltage level (e.g., 90% of a nominal voltage $V_2$), or a predetermined period to time has elapsed since the start of the predefined control mode. At the time point of switching, the DC current $i_2$ flowing through load R at the output side of the transformer 110 might not have reached the level of the maximum charging current $I_{2,chg}$. While operating in the voltage-current control mode, the output voltage may increase from 90% to 100% of $V_2$. The initial reference voltage $v_{2,ref}$ in the voltage-current control mode may be set as the output voltage at the end of the predefined mode (e.g., 0.9 $V_2$).

In some embodiments, the process 500 starts with the current control mode (i.e., starting point 2). The second duty cycle $d_2$ may be set as a nominal value $D_2$ (e.g., 0.5). The first duty cycle $d_1$ may be set to increase from an initial value (e.g., 0) to a nominal value $D_1$ (e.g., 0.5) over time. The reference current $i_{2,ref}$ may be set to follow a predefined profile. The process may then switch to the voltage-current control mode when a predefined event has occurred, e.g., when the DC voltage $v_2$ on load R at the output side of the transformer 110 has reached a predetermined voltage level (e.g., 0.9 of a nominal voltage $V_2$), or a predetermined period of time has elapsed since the start of the current control mode. While operating in the voltage-current control mode, the output voltage may increase from 90% to 100% of $V_2$. The initial reference voltage $v_{2,ref}$ in the voltage-current control mode may be set as 0.9 $V_2$.

As discussed above, in the predefined control mode, the second duty cycle $d_2$ may be set as a nominal value $D_2$ (e.g., 0.5), the first duty cycle $d_1$ may be set to increase from an initial value (e.g., 0) to a nominal value $D_1$ (e.g., 0.5), and the outer phase-shift angle β may be generated according to a predefined process to achieve various goals, such as synchronous rectification, increased start-up speed, transformer peak current limit, etc. The process for generating the outer phase-shift angle β in order to achieve various goals are discussed herein in more detail. It is assumed that the first duty cycle $d_1$ increases linearly from 0 to 0.5. It should be understood though, that the change of the first duty cycle $d_1$ may be set to follow any suitable (e.g., non-linear) profile. It should be understood that the values discussed above (e.g., duty cycle values, threshold voltage levels, etc.) are provided solely for purposes of illustration, and other values may be utilized in other embodiments without departing from the scope of the present disclosure.

Figure 6:
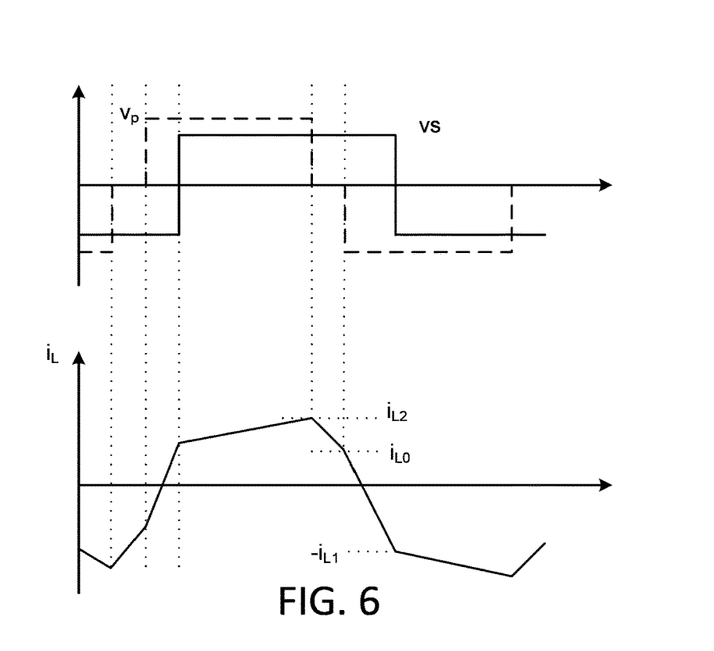
FIG. 6 is a graph of waveforms of input and output voltages and transformer current of a DAB DC-DC converter with a duty cycle at the output side equaling to 0.5, according to an example embodiment.

Referring to FIG. 6, waveforms of the input and output voltages $v_p$ and $v_s'$ and the transformer current $i_l$ flowing through a DAB DC-DC converter (e.g., the DAB DC-DC converter 100 of FIG. 1) with the second duty cycle $d_2$=0.5 are shown in a graph, according to an example embodiment. The level of the transformer current $i_l$ at the falling edge of $v_s'$ is:

$$i_{L1} = I_{base}\left[\beta - (1-m)\frac{\pi}{2}\right]. \quad (1)$$

The level of the circulating current at the falling edge of $v_p$ is:

$$i_{L2} = I_{base}[m\beta + (1-m)\pi d_1] \quad (2).$$

In the above equations:

$$m = \frac{1}{n}\frac{v_2}{V_1}, \quad (3)$$

$$I_{base} = \frac{V_1}{2\pi f_s L_{lk}}, \quad (4)$$

wherein $f_s$ is the switching frequency of the AC voltage/current of the converter 100, $V_1$ is the constant voltage at the input side and $v_2$ is a varying voltage at the output side. In some embodiments, the output phase-shift angle β is generated in order to achieve synchronous rectification, in which the transformer current is zero (0) when the output voltage $v_s'$ is zero. In other words, $i_{L1}=0$ in synchronous rectification. Thus, the output phase-shift angle β is:

$$\beta = (1-m)\frac{\pi}{2}. \quad (5)$$

When synchronous rectification is implemented, the soft-starting process may switch from the predefined control mode to the current control mode or the voltage-current control mode before β becomes too small, otherwise the output current $i_2$ might decrease significantly. The reason is that, as $v_2$ increases, m increases, so β decreases which limits the power being transferred. Because the switch devices $S_5$ through $S_8$ on the H-bridge $H_2$ at the output side are operating from the beginning, the process can smoothly switch to the current control mode or the voltage-current control mode.

In some embodiments, the outer phase-shift angle β is generated in order to limit the peak of the transformer current, for example, to not exceed a predetermined peak threshold $I_{peak}$ (i.e., to limit the peak transformer current during starting). Because the peak of the transformer current is the greater of $i_{L1}$ and $i_{L2}$, the output phase-shift angle β is, in the illustrated embodiment:

$$\beta_a = \min\left(\frac{1}{m}\left(\frac{I_{peak}}{I_{base}} - (1-m)\pi d_1\right), \frac{I_{peak}}{I_{base}} + (1-m)\frac{\pi}{2}\right). \quad (6)$$

As discussed above, the outer phase-shift angle β is less than π/2. In other words, the upper limit of β is set to the smaller of $\beta_a$ according to equation (6) and π/2. The predetermined peak threshold $I_{peak}$ may be so chosen that it would not damage the electronic components on the DAB DC-DC converter (e.g., switch devices) nor cause saturation of the transformer 110. $I_{peak}$ may be larger than the transformer peak current at the steady state (e.g., 1.2 times of the steady-state peak current, 1.5 times, 1.8 times, 2 times, etc.).

In some embodiments, the outer phase-shift angle β is generated in order to increase start-up speed. The power being transferred from the input side to the output side of the transformer is:

$$\frac{P}{P_{base}} = \begin{cases} \beta\left(1-\frac{\beta}{\pi}\right) - \frac{(1-2d_1)^2\pi}{4}, & \text{if } \beta \geq \left(\frac{1}{2}-d_1\right)\pi \\ 2\beta d_1, & \text{if } \beta < \left(\frac{1}{2}-d_1\right)\pi \end{cases} \quad (7)$$

In the above equations, $$P_{base} = \frac{V_1 v_2}{2\pi n L_{lk}}$$

Figure 7:
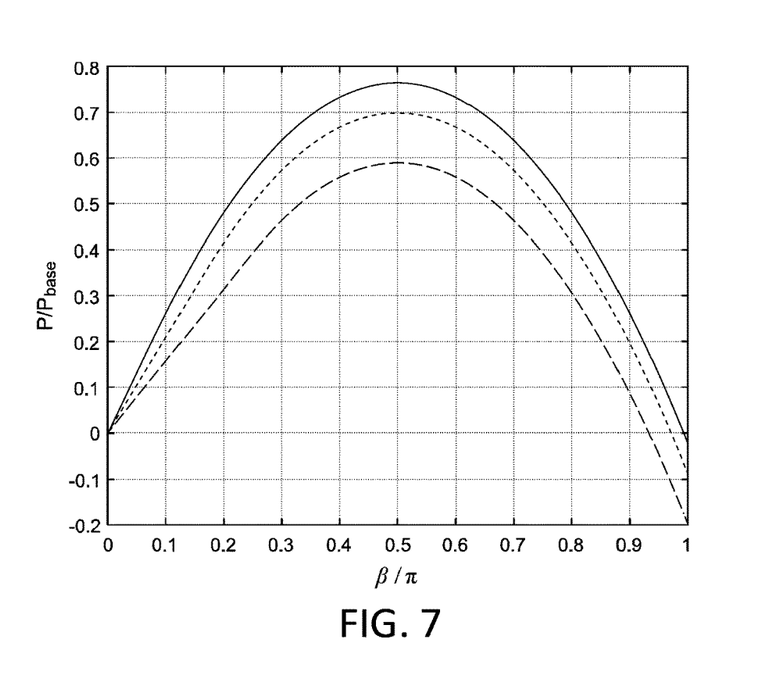
FIG. 7 is a graph showing the relationship between the normalized power being transferred through a transformer of a DAB DC-DC converter and an outer phase-shift angle.

Referring to FIG. 7, the relationship between the power being transferred through the transformer 110 and the outer phase-shift angle β under various values of the first duty cycle $d_1$ are shown in a graph. As seen from FIG. 7, the largest power transmission occurs at:

$$\beta = \pi/2 \quad (8).$$

When power transmission is maximized, the output voltage $v_2$ and output current $i_2$ can be sped up as much as possible.

The outer phase-shift angle β for achieving various goals discussed herein is summarized in Table 1, according to example embodiments. It should be understood that the processes for generating β as discussed herein are based on $d_1=d_2=0.5$ for illustration not for limitation. Any suitable processes can be used to generate β to achieve any suitable goals. Further, for the objectives illustrated in Table 1, it should be understood that other values or formulas for determining β may be utilized in various implementations, and all such modifications are contemplated within the scope of the present disclosure.

TABLE 1

Algorithms of β for different objectives

| Objective | $\beta_a$ |
|---|---|
| Synchronous rectification | $(1-m)\dfrac{\pi}{2}$ |
| Fast charging | $\dfrac{\pi}{2}$ |
| Limiting transformer peak current | $\min\left(\dfrac{1}{m}\left(\dfrac{I_{peak}}{I_{base}} - (1-m)\pi d_1\right),\right.$ $\left.\dfrac{I_{peak}}{I_{base}} + (1-m)\pi d_1, \dfrac{\pi}{2}\right)$ |

As discussed above, in the current control mode, the outer phase-shift angle β is generated based on the reference current $i_{2,ref}$ and the DC current $i_2$ flowing through the load R at the output side of the transformer 110. For example, the outer phase-shift angle β is generated by a PI controller in order to reduce the difference between $i_2$ and $i_{2,ref}$. The reference current $i_{2,ref}$ may follow a profile defined by a user. In some embodiments, the profile defines a reference current changing linearly over time. In other embodiments, the profile defines a reference current changing non-linearly with time. In further embodiments, the profile is defined so that the changing rate of the charging current (di/dt) does not exceed a predetermined rate threshold at any point of time. The DC current $i_2$ flowing through load R at the output side may be measured by a current sensor.

In some embodiments, the soft starting process starts with the current control mode. The second duty cycle $d_2$ may be set as a nominal value $D_2$ (e.g., 0.5). The first duty cycle $d_1$ may be set to increase from an initial value (e.g., 0) to a nominal value $D_1$ (e.g., 0.5) over time. The reference current $i_{2,ref}$ may be set to follow a predefined profile. In other embodiments, the soft starting process starts with the predefined control mode and switches to the current control mode when certain event occurs, for example, when the first duty cycle $d_1$ has reached 0.5 or the output current $i_2$ has reached a predetermined current threshold $I_{2,chg}$ (e.g., the maximum charging current).

In the voltage-current control mode, the reference current $i_{2,ref}$ is generated based on the reference voltage $v_{2,ref}$ and the DC voltage $v_2$ on the load R at the output side of the transformer 110. For example, the reference current $i_{2,ref}$ is generated by a PI controller in order to reduce the difference between $v_{2,ref}$ and $v_2$. Then the outer phase-shift angle β is generated based on the reference current $i_{2,ref}$ and the DC current $i_2$ flowing through load R at the output side of the transformer 110. The reference voltage $v_{2,ref}$ may follow a profile defined by the user. In some embodiments, the profile defines a reference voltage value changing linearly over time. In other embodiments, the profile defines a reference voltage changing non-linearly over time. The DC voltage $v_2$ on load R at the output side may be measured by a voltage sensor. In some embodiments, the soft starting process switches directly from the predefined control mode to the voltage-current control mode when certain event occurs, for example, when $v_2$ has reached a predetermined voltage level (e.g., 90% of a nominal voltage $V_2$) or when a predetermined period of time has passed since the start of the predefined control mode. In other embodiments, the soft starting process switches from the current control mode to the voltage-current control mode when certain event occurs, for example, when $v_2$ has reached a predetermined voltage level (e.g., 90% of a nominal voltage $V_2$) or when a predetermined period of time has passed since the start of the current control mode.

The control signal waveforms for the switch devices $S_1$ through $S_8$ can be determined when the outer phase-shift angle β and the first and second duty cycles $d_1$ and $d_2$ are known, as shown by FIG. 3. The converter 410 thus generates the corresponding pulse width modulation signals to control the on/off state for each of the switch devices $S_1$ through $S_8$.

With the soft-starting control methods disclosed herein, large inrush current can be avoided. In addition, various goals can be achieved, such as reduced power loss, increased start-up speed, and output current/voltage profiles as defined by the user. By limiting the output current and transformer peak current during the startup process, electric components with low current ratings can be used, which reduces system cost. The output voltage and current profiles are under control, which increases the safety and reliability of the product. The soft-starting control methods disclosed herein can be used with any steady-state control methods for the DAB DC-DC converter, such as single-phase-shift (SPS), dual-phase-shift (DPS), and extended-phase-shift (EPS) and can be used in various applications, e.g., battery charging.

Figure 9A:
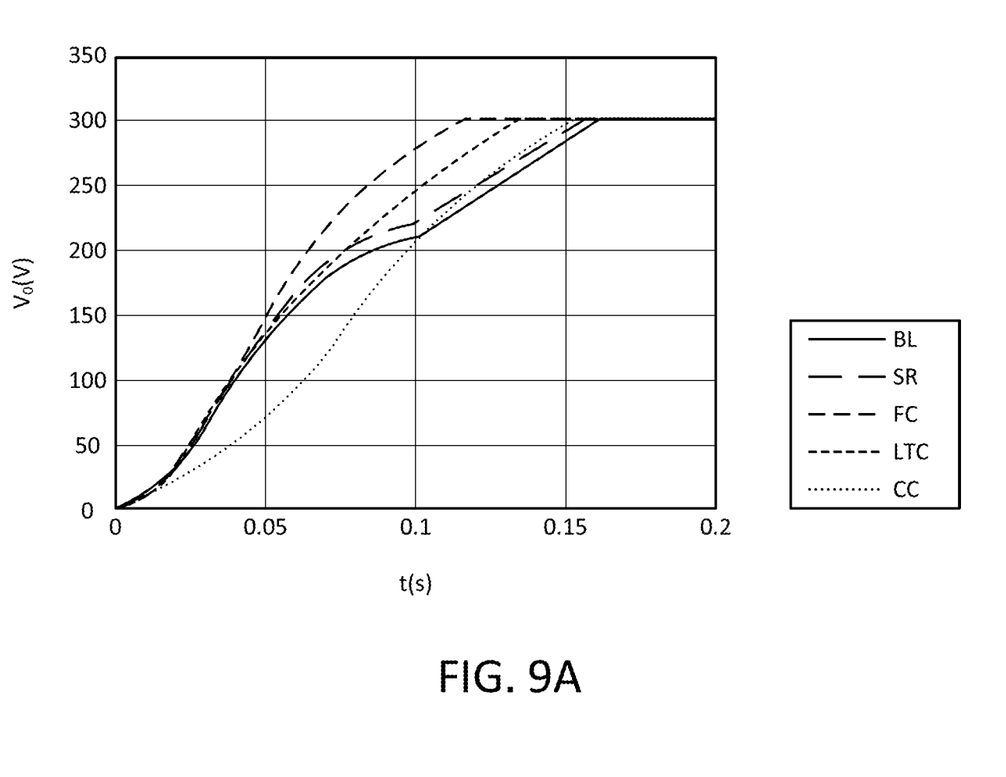
FIG. 9A is a graph showing simulated output voltages for various soft-starting processes disclosed herein in comparison with the previous soft-starting method.
Figure 9B:
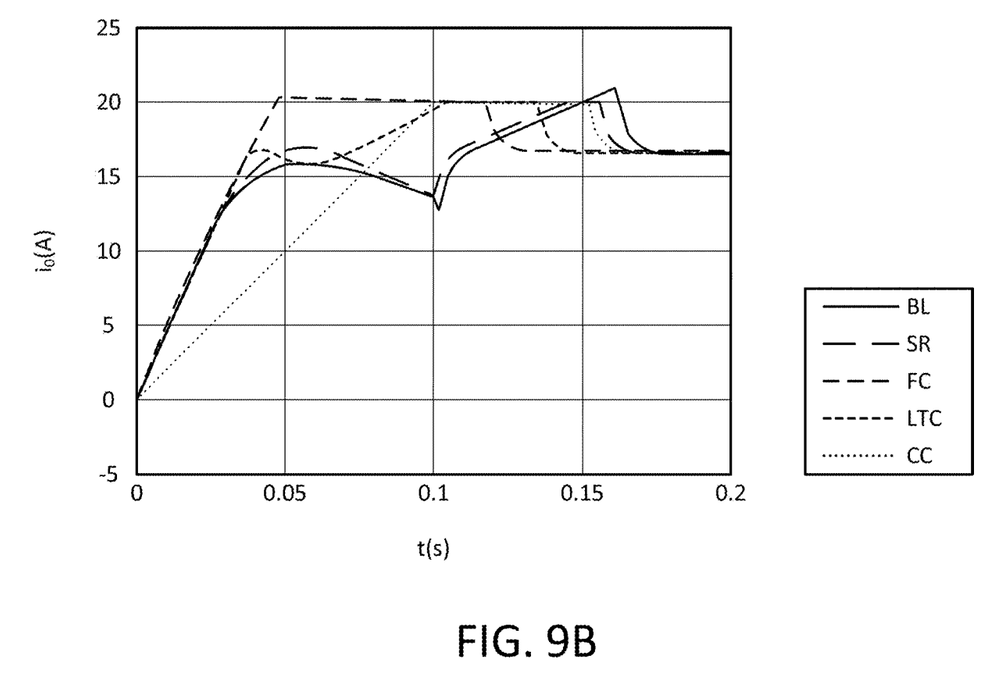
FIG. 9B is a graph showing simulated output currents for various soft-starting processes disclosed herein in comparison with the previous soft-starting method.
Figure 9C:
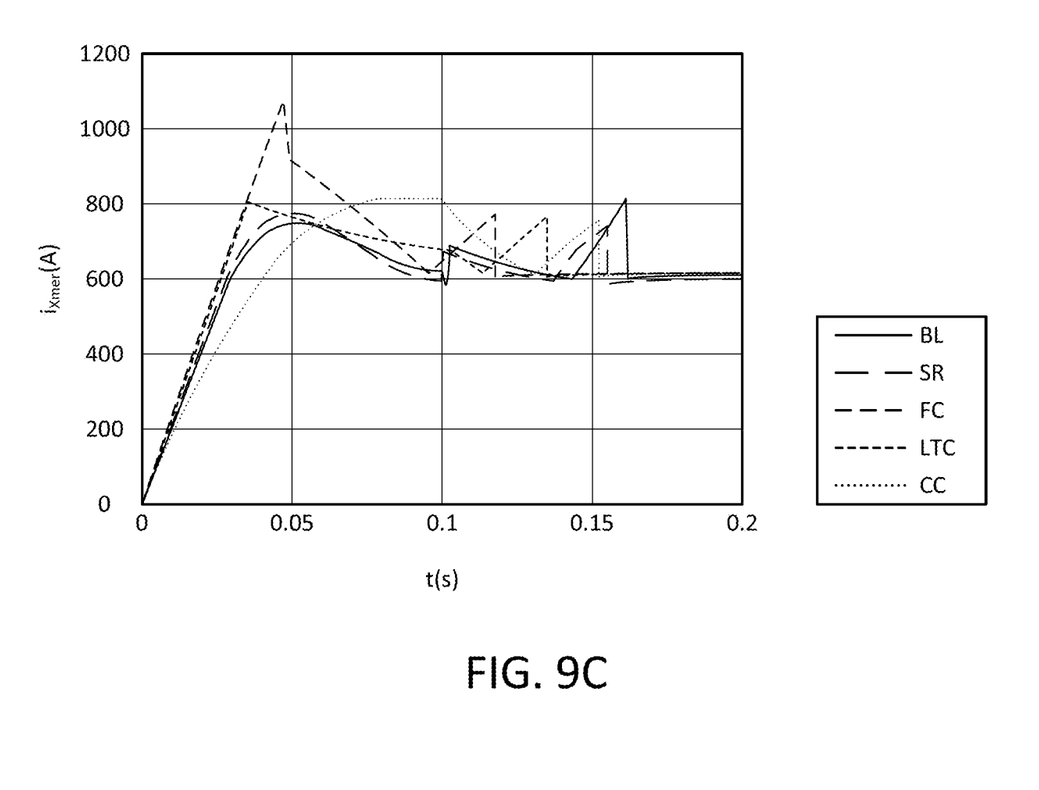
FIG. 9C is a graph showing simulated transformer peak currents for various soft-starting processes disclosed herein in comparison with the previous soft-starting method.

Example embodiments of the soft-starting methods described herein were simulated using Matlab/Simulink. In the simulation, $V_1$=12 V, $V_2$=300 V, $L_{lk}$=41 nH, n=24, $I_{2,chg}$=20 A, $I_{peak}$=750 A, and the steady-state power is 5 kW. The output voltage, output current, and transformer peak current for various soft starting processes disclosed herein are compared with a previous soft-starting method, as shown in FIGS. 9A, 9B, and 9C. The previous soft-starting method was described in *Soft-Starting procedure for dual active bridge converter*, Giuliani Francesco, et al., Control and Modeling for Power Electronics (COMPEL), 2015 IEEE 16th Workshop, pp. 1-6. IEEE, 2015.

Figure 8A:
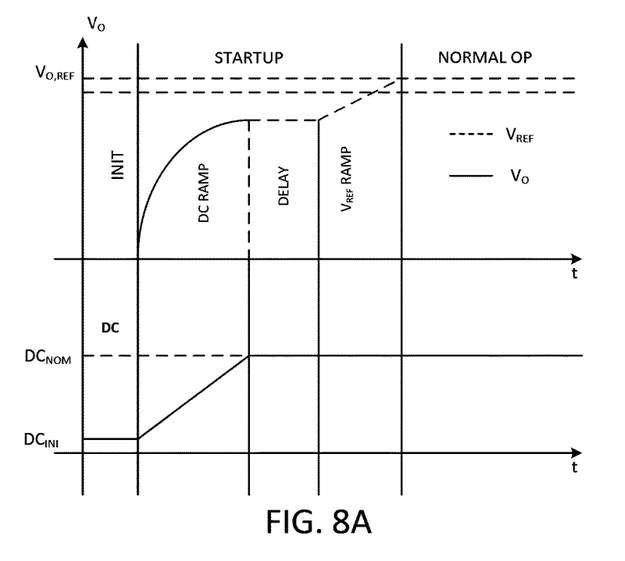
FIG. 8A is a graph showing the waveforms of a reference voltage, and first and second duty cycles according to a previous soft-starting method.
Figure 8B:
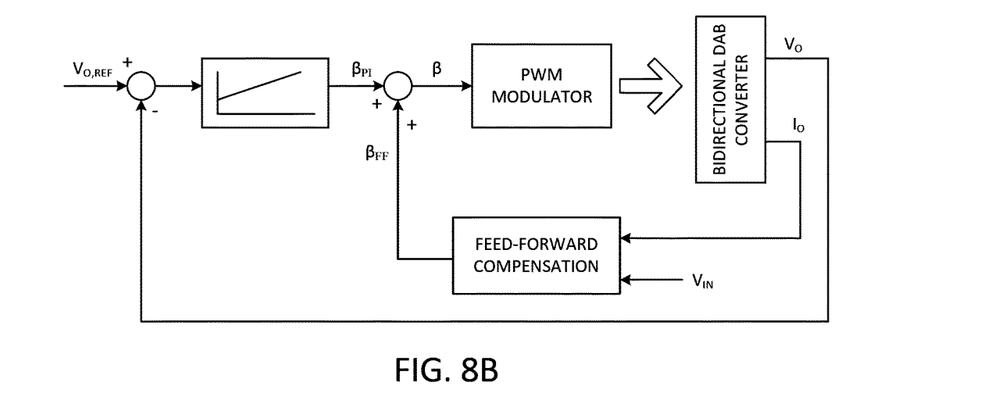
FIG. 8B is a schematic diagram of a controller used in the previous soft-starting method.

FIGS. 8A and 8B are provided to illustrate an existing soft-starting method for comparison. FIG. 8A shows the waveforms of the reference voltage, and the first and second duty cycles according to the previous soft-starting method. FIG. 8B shows schematic diagram of the controller used in the previous soft-starting method. The method includes three stages of control during startup of the DAB converter. At the first stage, the first duty cycle $d_1$ is increased linearly from 0 to 0.5, and $S_5$ through $S_8$ are all off so current flows through their anti-parallel diodes. The output voltage $V_0$ at the time point when $d_1$ reaches 0.5 is recorded. At the second stage, $d_1$ and $d_2$ are set as 0.5, the outer phase-shift angle β is generated using PI controller with feed-forward control in which $V_0$ is used as the reference voltage $v_{ref}$ for a period of time. At the third state, the reference voltage $V_{ref}$ is increased linearly until it reaches the nominal output voltage $V_{0,nominal}$. The feed-forward outer phase-shift angle is:

$$\beta_{FF} = \frac{\pi}{2}\left(1 - \sqrt{1 - \frac{8nf_sL_{lk}i_0}{V_1}}\right). \qquad (9)$$

FIGS. 9A through 9C show the simulation results for soft-starting processes disclosed herein with comparison to the previous soft-starting method shown in FIGS. 8A and 8B. FIG. 9A shows the simulated output voltages. FIG. 9B shows the simulated output currents. FIG. 9C shows the simulated transformer peak currents. In the figures, curves labeled as "BL" represent simulated results for the previous soft-starting method as the baseline. Curves labeled as "SR" represent simulated results for the process in which the control starts with the predefined control mode, the outer phase-shift angle β is generated to achieve synchronous rectification according to equation (5), and the control switches to current control mode when $d_1$ reaches 0.5. Curves labeled as "FC" represent simulated results for the process in which the control starts with the predefined control mode, and β is generated to achieve increased start-up speed according to equation (8). Curves labeled as "LTC" represent simulated results for the process in which the control starts with the predefined control mode, and β is generated to limit transformer peak current according to equation (6). Curves labeled as "CC" represent simulated results for the process in which the control starts with the current control mode, and the reference current increases linearly from zero (0) to the maximum charging current $I_{2,chg}$.

As shown in the figures, results for "SR" (synchronous rectification) are close to results for BL (previous method) since synchronous rectification does not change the voltage/current waveforms. However, results for "SR" show less loss and delay. Results for "FC" show the fastest speed to reach the nominal output voltage/current. Results for "LTC" show controlled peak current (~800 A). Results for "CC" show that the output current does follow the predefined current profile in which the output current increase linearly.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A controller for soft starting a dual-active-bridge direct current to direct current (DC-DC) converter that comprises a transformer, a first H-bridge connected to a primary winding of the transformer, and a second H-bridge connected to a secondary winding of the transformer, the controller configured to:
   perform a predefined control mode in which an outer phase-shift angle is determined based on a predefined process, wherein the outer phase-shift angle is a phase shift between a first voltage on the primary winding and a second voltage on the secondary winding;
   determine that a first predefined event has occurred;
   after performing the predefined control mode and in response to determining that the first predefined event has occurred, switch to a current control mode in which the outer phase-shift angle is determined based on a predefined reference current profile and a DC current output from the second H-bridge;
   determine that a second predefined event has occurred;
   in response to determining that the second predefined event has occurred, switch to a voltage-current control mode in which a reference current value is determined using a reference voltage value and a DC voltage output from the second H-bridge, and the outer phase-shift angle is determined using the reference current value and the DC current output from the second H-bridge.

2. The controller of claim 1, wherein the predefined reference current profile is configured to reduce an inrush current during starting of the dual-active-bridge DC-DC converter.

3. The controller of claim 1, wherein the predefined reference current profile includes a linearly or non-linearly increasing reference current value.

4. The controller of claim 1, wherein the second predefined event includes that the DC voltage output from the second H-bridge has reached a predetermined voltage threshold or that a predetermined period of time has elapsed since start of the current control mode.

5. The controller of claim 1, wherein the first predefined event includes that a first duty cycle for the first voltage has reached a predetermined duty cycle value or that the DC current output from the second H-bridge has reached a predetermined current threshold.

6. The controller of claim 1, wherein the predefined process is configured to achieve synchronous rectification using the outer phase-shift angle in the predefined control mode.

7. The controller of claim 1, wherein the predefined process is configured to increase start-up speed using the outer phase-shift angle in the predefined control mode.

8. The controller of claim 1, wherein the predefined process is configured to limit a peak current flowing through the transformer not to exceed a predetermined peak threshold using the outer phase-shift angle in the predefined control mode.

9. A method for soft-starting a dual-active bridge direct current to direct current (DC-DC) converter that comprises a transformer, a first H-bridge connected to a primary winding of the transformer, and a second H-bridge connected to a secondary winding of the transformer, the method comprising:
   performing a predefined control mode in which an outer phase-shift angle is determined based on a predefined process, wherein the outer phase-shift angle is a phase shift between a first voltage on the primary winding and a second voltage on the secondary winding;
   determining that a first predefined event has occurred;
   after performing the predefined control mode and in response to determining that the first predefined event has occurred, switching to a current control mode in which an outer phase-shift angle is determined based on a predefined reference current profile and a DC current output from the second H-bridge;
   determining that a second predefined event has occurred;
   in response to determining that the second predefined event has occurred, switching to a voltage-current control mode in which a reference current value is determined using a reference voltage value and a DC voltage output from the second H-bridge, and the outer phase-shift angle is determined using the reference current value and the DC current output from the second H-bridge.

10. The method of claim 9, wherein the predefined reference current profile includes a linearly or non-linearly increasing reference current value.

11. The method of claim 9, wherein the second predefined event includes that the DC voltage output from the second H-bridge has reached a predetermined voltage threshold or that a predetermined period of time has elapsed since start of the current control mode.

12. The method of claim 9, wherein the first predefined event includes that a first duty cycle for the first voltage has reached a predetermined duty cycle value or that the DC current output from the second H-bridge has reached a predetermined current threshold.

13. The method of claim 9, wherein the predefined process is configured to achieve synchronous rectification using the outer phase-shift angle in the predefined control mode.

14. The method of claim 9, the predefined process is configured to increase power transmission using the outer phase-shift angle in the predefined control mode.

15. The method of claim 9, wherein the predefined process is configured to limit a peak of a circulating current flowing through the transformer not to exceed a predetermined peak threshold using the outer phase-shift angle in the predefined control mode.

* * * * *